US011982625B2

(12) United States Patent
Anderson et al.

(10) Patent No.: US 11,982,625 B2
(45) Date of Patent: May 14, 2024

(54) SYSTEM INCLUDING A CARS OPTICAL SYSTEM

(71) Applicant: ATONARP INC., Tokyo (JP)

(72) Inventors: David Anderson, Fremont, CA (US); Mateusz Plewicki, Fremont, CA (US); Dmitriy Churin, Fremont, CA (US); Anand Pandurangan, Fremont, CA (US); Andrew Zhang, Fremont, CA (US); Lukas Brueckner, Nieder-Olm (DE); Prakash Sreedhar Murthy, Tokyo (JP)

(73) Assignee: ATONARP INC., Tokyo (JP)

( * ) Notice: Subject to any disclaimer, the term of this patent is extended or adjusted under 35 U.S.C. 154(b) by 263 days.

(21) Appl. No.: 17/596,517

(22) PCT Filed: Jun. 25, 2020

(86) PCT No.: PCT/JP2020/024954
§ 371 (c)(1),
(2) Date: Dec. 13, 2021

(87) PCT Pub. No.: WO2020/262513
PCT Pub. Date: Dec. 30, 2020

(65) Prior Publication Data

US 2022/0317044 A1 Oct. 6, 2022

Related U.S. Application Data

(60) Provisional application No. 62/866,115, filed on Jun. 25, 2019.

(51) Int. Cl.
*G01N 21/65* (2006.01)

(52) U.S. Cl.
CPC ....... *G01N 21/65* (2013.01); *G01N 2021/653* (2013.01); *G01N 2201/06113* (2013.01)

(58) Field of Classification Search
CPC ............................................... G01N 2021/653
See application file for complete search history.

(56) References Cited

U.S. PATENT DOCUMENTS 9,521,953 B2 * 12/2016 Toida .................. A61B 5/0066
2006/0066848 A1 3/2006 Frankel
2021/0381986 A1 * 12/2021 Doughty .............. G01N 21/211

FOREIGN PATENT DOCUMENTS

KR 1020140045628 A 4/2014
WO 2014061147 A1 4/2014
WO 2014180986 A1 11/2014

OTHER PUBLICATIONS

J. G. Porquez, "Brighter CARS hypermicroscopy via "spectral surfing" of a Stokes supercontinuum", May 11, 2017 (Year: 2017).*

(Continued)

*Primary Examiner* — Maurice C Smith
(74) *Attorney, Agent, or Firm* — BUCHANAN INGERSOLL & ROONEY PC

(57) ABSTRACT

A system for measurement is provided. The system includes a first optical path configured to supply first light pulses with a first range of wavelengths; a second optical path configured to supply second light pulses with a second range of wavelengths shorter than the first range of wavelengths; an optical I/O unit configured to emit the first light pulses and the second light pulses to a target and acquire a light from the target to detect CARS light pluses from the target by a detector; and a first phase modulating unit configured to vary phase differences between the first light pulses and the second light pulses as the first light pulses and the second light pulses are emitted via the optical I/O unit.

19 Claims, 4 Drawing Sheets

(56) References Cited

OTHER PUBLICATIONS

International Search Report (PCT/ISA/210) and Written Opinion (PCT/ISA/237) dated Sep. 24, 2020, by the Japanese Patent Office as the International Searching Authority for International Application No. PCT/JP2020/024954.

Isobe et al., "Nonlinear Optical Microscopy and Spectroscopy Employing Octave Spanning Pulses", IEEE Journal of Selected Topics in Quantum Electronics, Vil. 16, No. 4, pp. 767-780; Jul./Aug. 2010.

* cited by examiner

[Fig. 1]
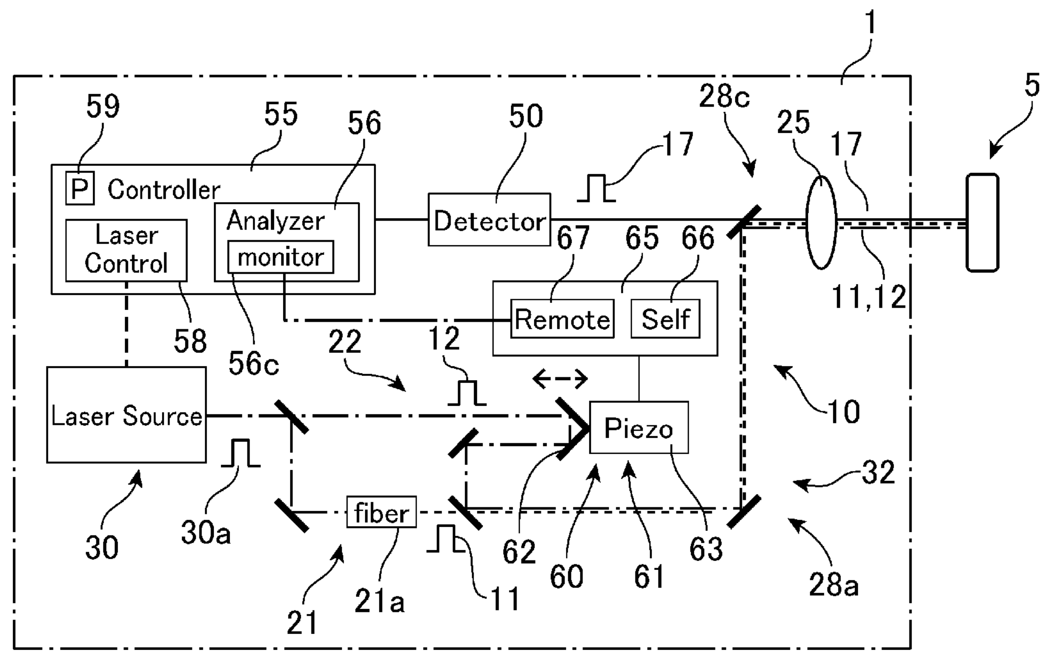
[Fig. 2]
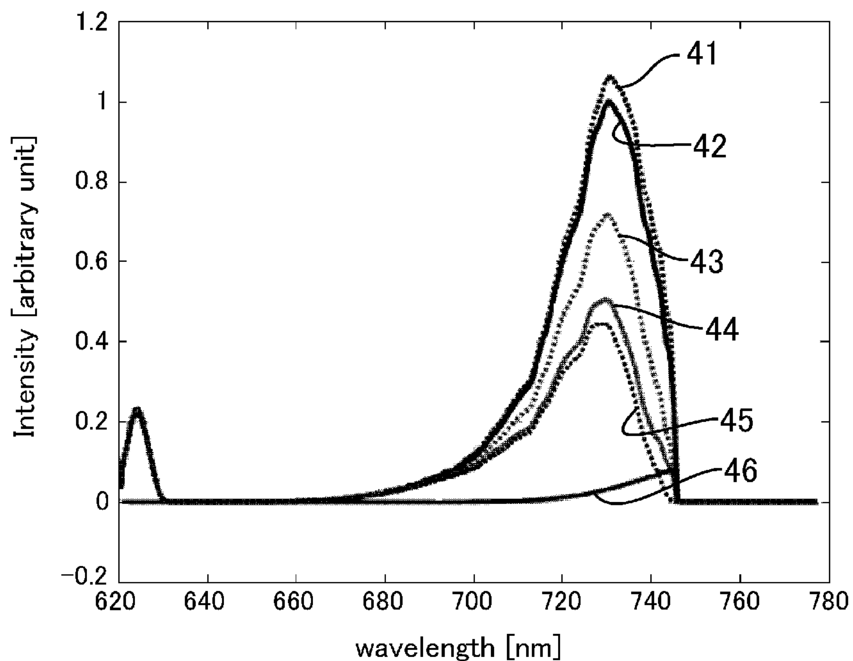

[Fig. 3]
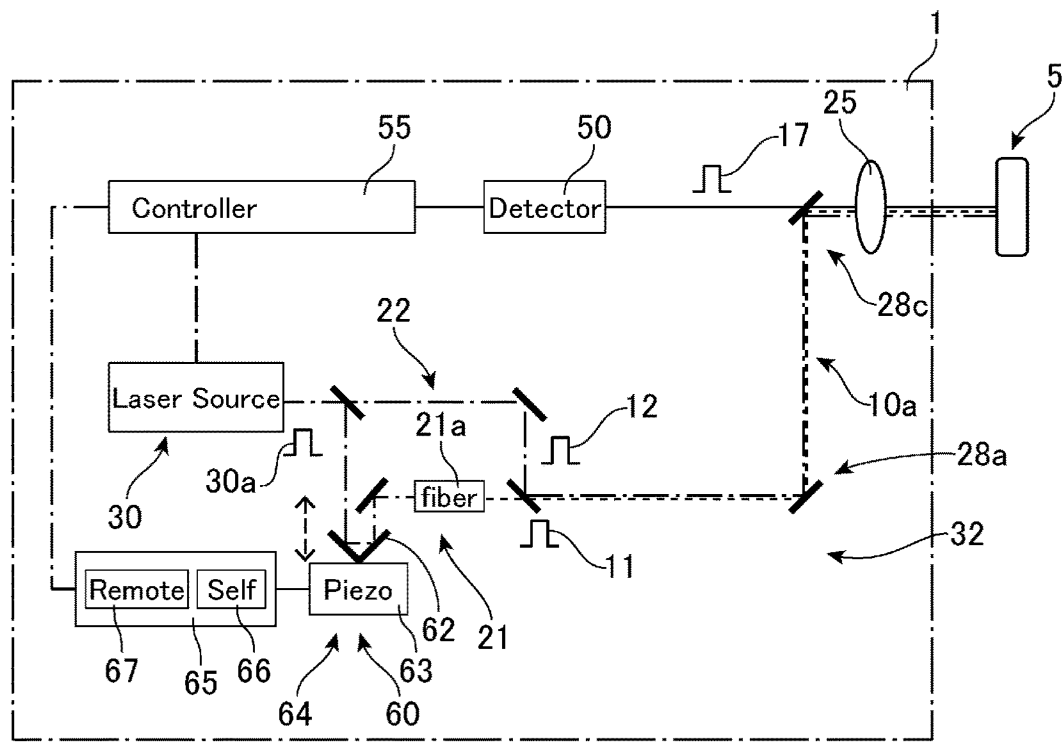
[Fig. 4]
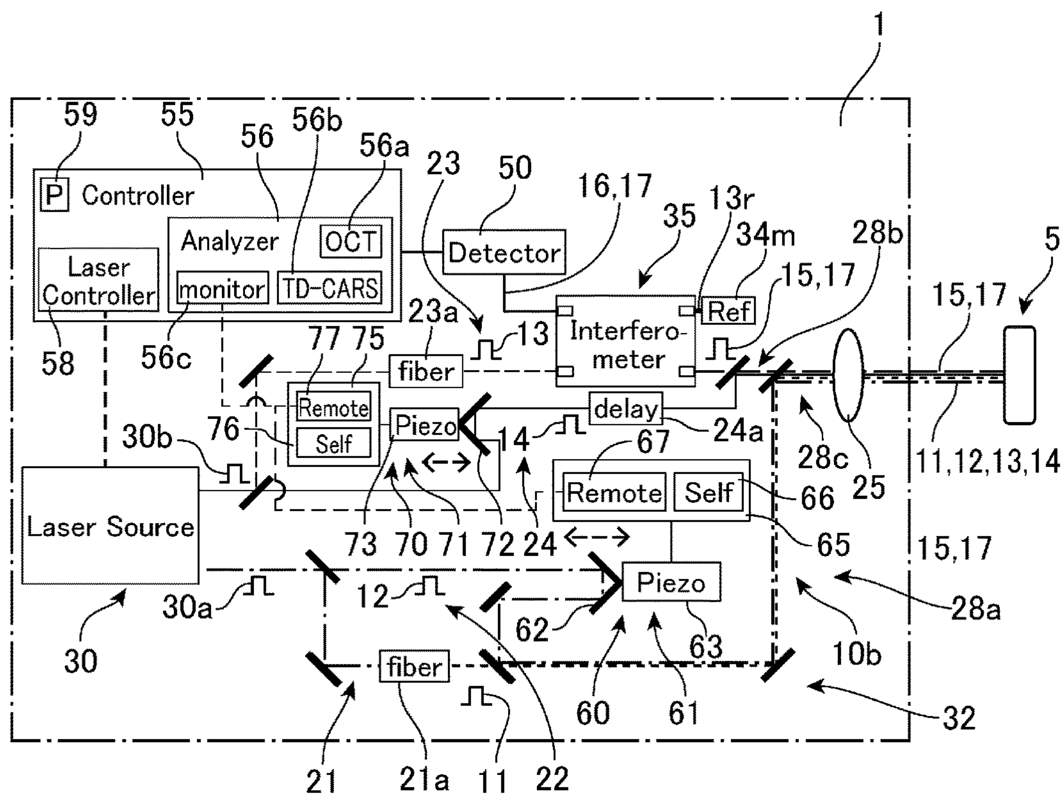

[Fig. 5]
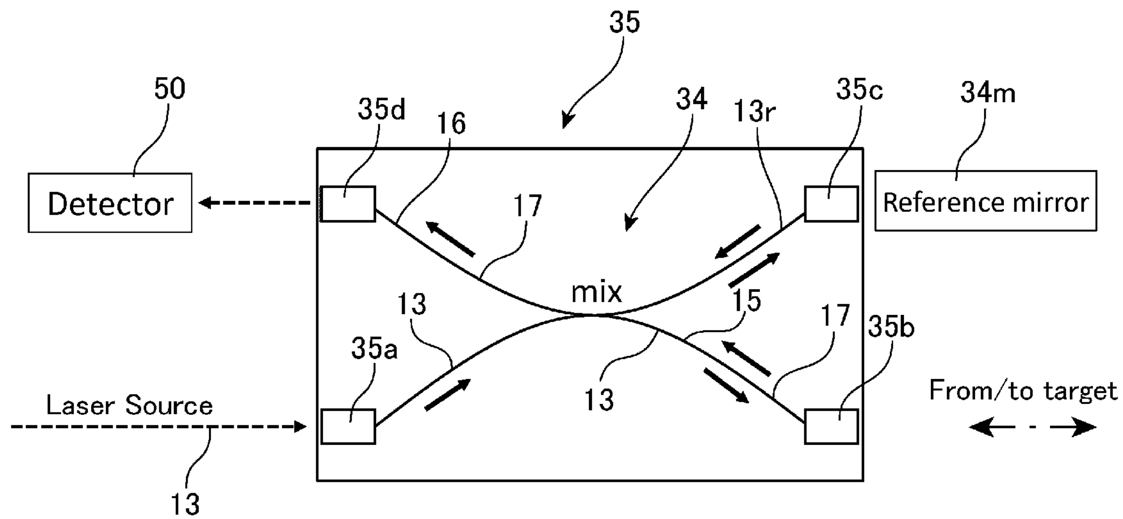
[Fig. 6]
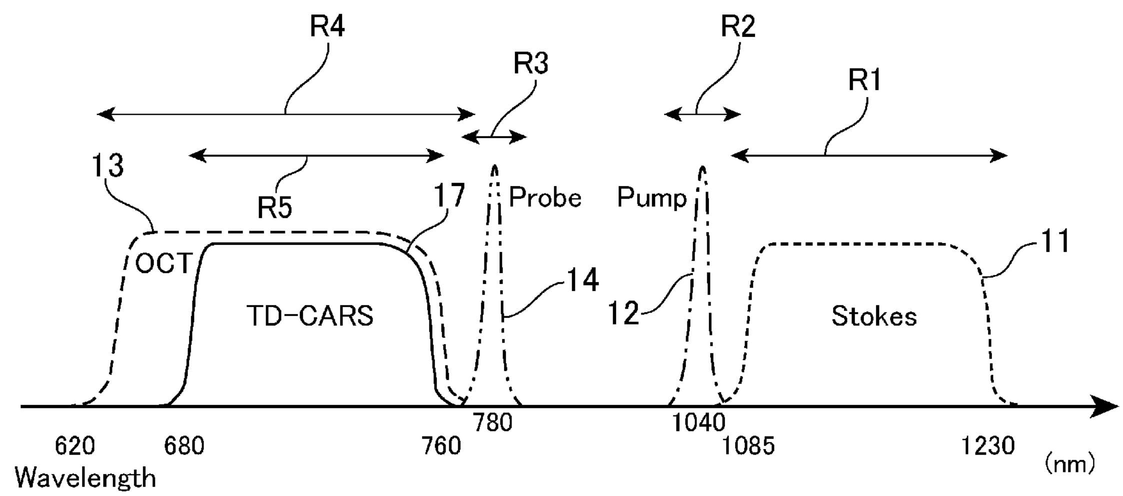

[Fig. 7]
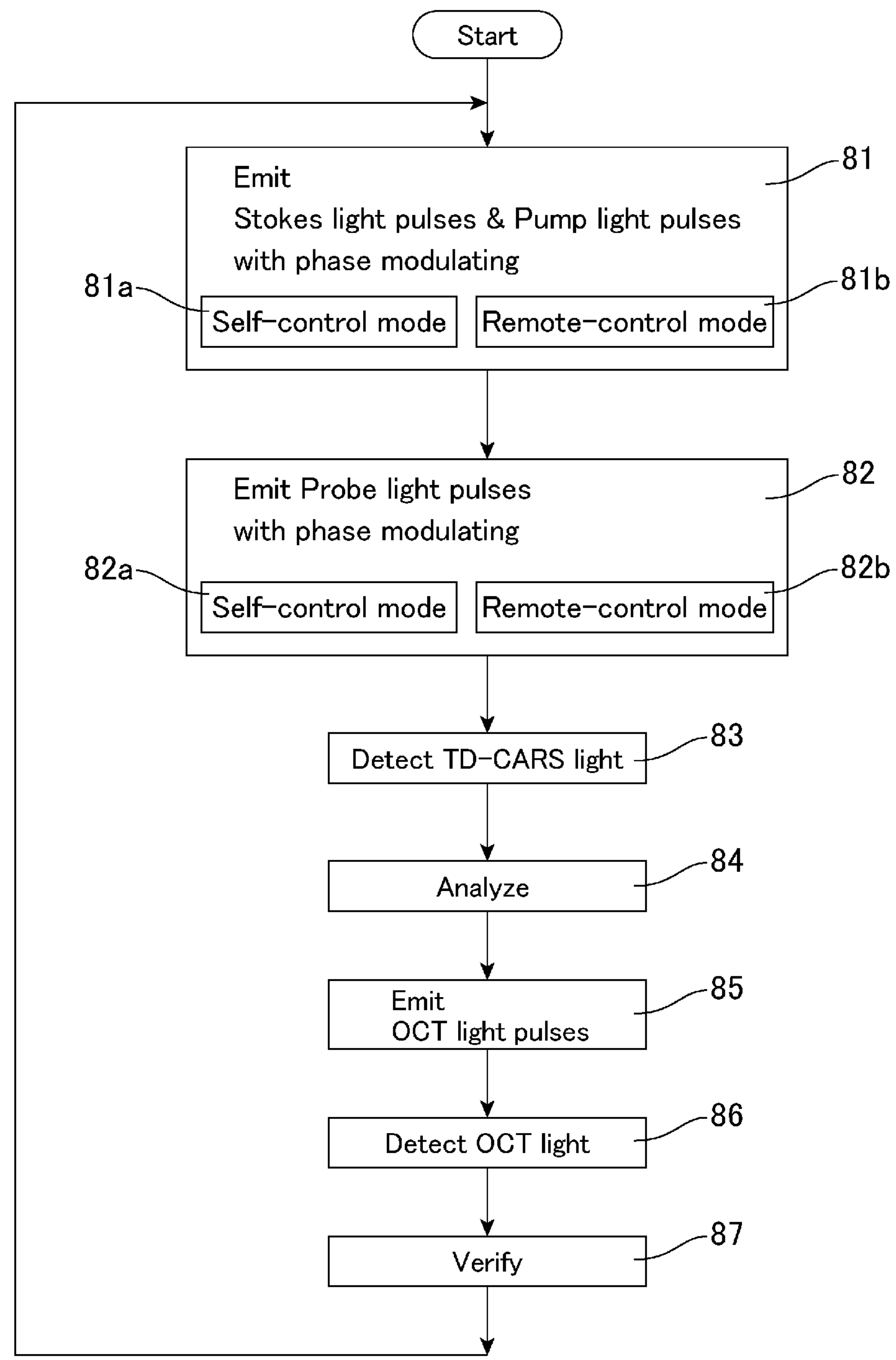

SYSTEM INCLUDING A CARS OPTICAL SYSTEM

TECHNICAL FIELD

The invention generally relates to a system that includes a cars optical system.

BACKGROUND ART

In the publication WO2014/061147, a microscope is disclosed. The microscope includes: a first light dividing part that divides a light flux of light from a light source into a first pump light flux and a second pump light flux; a Stokes light source that receives the second pump light flux as an input and outputs a Stokes light flux: a multiplexing part that multiplexes the first pump light flux and the Stokes light flux to generate a multiplexed light flux; a first light-collecting part that collects the multiplexed light flux in a sample; a first detector that detects a CARS light generated from the sample, the CARS light having a wavelength different from the multiplexed light flux; a second light dividing part that lets at least one of the second pump light flux and the Stokes light flux branch partially as a reference light flux; a second multiplexing part that multiplexes a light flux from the sample and the reference light flux to generate interfering light; and a second detector that detects the interfering light.

SUMMARY OF INVENTION

The present invention relates generally to a system that integrates Raman spectroscopy (RS), and more particularly to a system that integrates a Coherent Anti-Stokes Raman Scattering (CARS). The system may be applicable to a system for biochemical and structural characterization of a target of interest of a living subject, and more particularly, for non-invasive evaluation of the biochemical compositions of a target of interest of a living subject and applications of the same.

One of aspects of this invention is a system comprising: a first optical path configured to supply first light pulses with a first range of wavelengths; a second optical path configured to supply second light pulses with a second range of wavelengths shorter than the first range of wavelengths; an optical I/O unit configured to emit the first light pulses and the second light pulses to a target and acquire a light from the target to detect CARS light pluses from the target by a detector; and a first phase modulating unit configured to vary phase differences between the first light pulses and the second light pulses as the first light pulses and the second light pulses are emitted via the optical I/O unit.

CARS is a multiphoton process where molecular bonds are excited into a phase aligned oscillatory state through the interaction of a first light (pump light beam, pump beam) with a first wavelength and a second light (Stokes light beam, Stokes beam) of a second wavelength. When the natural resonance state of the molecular bond is equal to the difference in wavelength, then a state of resonance is created. This resonance can be coherently probed with a probe light beam (probe beam). Pump beam is usually used as the probe beam as well. When the stokes beam consists of a broad band spectrum, the Pump-Stokes (P-S) interaction occurs with each wavelength of the Stokes beam creating a full coherent output spectrum. However, in addition to the Pump-Stokes exciting a molecule into resonance, 2 wavelengths in the Stokes beam can also trigger an oscillatory resonance when they are separated by an equivalent difference equal to the natural resonant state of the molecular bond. This is referred to as Stokes-Stokes (S-S) excitation. Both processes can either constructively or destructively add to the emission process based on the phase relationship between the pump and Stokes signals which can be affected by temporal delays equivalent to a fraction of a wavelength. In this case, with wavelengths of approx. 1 um of the pump beam, a full shift is only 500 nm equivalent to 0.01% variation in fiber length over a 5-meter fiber length.

In this invention, the system emits pulsed first light and second light, and the first phase modulating unit changes phase differences between the first light pulses and the second light pulses as the first light pulses and the second light pulses are emitted via the optical I/O unit. Therefore, constructive or destructive interference between the first light (such as the Stokes light) and the second light (such as the pump light) depending on the relative phase between the first light and the second light can be controlled in pluses.

The system may comprise a first modulating control unit that is configured to cyclically shift the phase differences between the first light pulses and the second light pulses using the first phase modulating unit. In this case, the detector can detect signals with averaged intensities, which could be the middle intensities between the constructive intensities and the destructive intensities, by the CARS light pulses generated by the first light pulses and the second light pulses. The system may comprise a second modulating control unit that is configured to vary the phase differences between the first light pulses and the second light pulses so that peak of a known component of spectrum of the CARS light pulses is maximized. In this case, the detector can detect signals with higher intensities, which could be the constructive intensities, by the CARS light pulses generated by the first light pulses and the second light pulses.

Another aspect of this invention is a method that comprises: (i) emitting first light pulses with a first range of wavelengths and second light pulses with a second range of wavelengths shorter than the first range through an optical unit that is configured to output the first light pulses and the second light pulses to a target and acquire CARS light pulses from the target; (ii) detecting CARS light pulses acquired thought the optical unit from the target by a detector; and (iii) varying phase differences between the first light pulses and the second light pulses as the first light pulses and the second light pulses are emitted thought the optical unit.

BRIEF DESCRIPTION OF DRAWINGS

The embodiments herein will be better understood from the following detailed description with reference to the drawings, in which:

FIG. 1 shows an embodiment of a CARS optical system of this invention.

FIG. 2 shows examples of CARS spectra.

FIG. 3 shows another embodiment of a CARS optical system.

FIG. 4 shows an embodiment of a TD-CARS optical system.

FIG. 5 shows an interferometer.

FIG. 6 shows a wavelength plan.

FIG. 7 shows a flow diagram of measuring method performed by the TD-CARS optical system.

DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

FIG. 1 illustrates a system 1 according to an embodiment of this invention. The system 1 includes the optical system 10 and a controller 55. This system 1 can be used as a measurement device, analyzer, monitoring device, monitor and others depending on the applications. The optical system 10 uses CARS (Coherent Anti-Stokes Raman Scattering) to acquire data indicative of surface and internal conditions and components of a target 5 such as a human body. The controller 55 includes an analyzer 56 that analyzes internal compositions (components) by CARS. The analyzer 56 may include a monitor (monitoring module) 56*c* to verify the part of target 5 at which the CARS light 17 is generated. A program (program produce, software, application) 59 stored in the memory of the controller 55 is provided for running the process on the controller 55 with computer resources such as the memory, CPU, and others. The program (software) 59 may be provided as other memory medium readable by a processor or a computer.

The optical system 10 includes a laser source 30 for generating first laser pulses 30*a* with a first wavelength 1040 nm for Stokes light pulses (Stokes beam pulses, first light pulses) 11 and pump light pulses (pump beam pulses, second light pulses) 12. One of preferable laser source 30 is a fiber laser. The first laser pulses 30*a* include one to several hundred fS (femto second)-order pulses with tens to hundreds of mW. The optical system 10 includes a plurality of optical elements 32 such as lenses, filters, mirrors, dichroic mirrors and prisms for arranging optical paths to separate and combine the leaser light pulses.

The optical system 10 includes a Stokes light path (first optical path, Stokes unit) 21 that is configured to supply the Stokes light pulses (first light pulses) 11 with a first range R1 of wavelengths 1080-1300 nm from the first laser pulses 30*a* which are common to the pump light pulses 12, through the PCF (Photonic Crystal Fiber, fiber) 21*a*. The optical system 10 includes a pump light path (second optical path, pump unit) 22 that is configured to supply the pump light pulses (second light pulses) 12 with a second range R2 of wavelengths 1070 nm that is shorter than the first wavelength range (first range) R1 from the first laser pulses 30*a* which is common to the Stokes light 11. The optical system 10 includes a common optical path 28*a* that supplies the Stokes light pulses 11 provided by the path 21 and the pump light pulses 12 provided by path 22 to the optical I/O unit (lens system) 25. The optical path 21, 22, and 28*a* include necessary optical elements 32 such as filters, fibers, dichroic mirrors and prisms to configure each optical path. The same applies to the optical paths described below.

The optical system 10 further includes the optical I/O unit (optical unit) 25 that is configured to coaxially output the Stokes light pulses 11 and the pump light pulses 12 to the target 5 and acquire a light from the target 5 via a common light path 28*c*. A typical optical I/O unit 25 is an objective lens or lens system that faces to the target 5 and, through the lens 25, the Stokes light pulse 11 and the pump light pulses 12 are emitted or irradiated to the target 5 and the CARS light pulses 17 are acquired or received from the target 5. The CARS light pulses 17 generated by the Stokes light pulses 11 and the pump light pulses 12 with several hundred fS (femto second)-order pulse width may have a wavelengths 900-1000 nm. The CARS light pulses 17 are detected by a detector 50 and the spectra included in the CARS light pulses are analyzed by the analyzer 56. The optical system 10 gets backward CARS light pulses (Epi-CARS) 17 and includes the first input optical path 28*c* that is configured to guide the backward CARS light pulses 17 from the optical I/O unit 25. The optical system 10 may include an optical path configured to get forward CARS light.

The optical system 10 includes a phase modulating unit (a first phase modulating unit) 60 that is configured to vary phase differences between the Stokes light pulses (the first light pulses) 11 and the pump light pulses (the second light pulses) 12 as the Stokes light pulses 11 and the pump light pulses 12 are emitted via the optical I/O unit 25. The phase modulating unit 60 may be an LC-SLM (Liquid crystal spatial light modulator), an AWG (Arrayed wave-guide grating) and others. In this optical system 10, the phase modulating unit 60 includes a delay modulating unit 61 that is configured to modulate a light path (a length of light path) of at least one of the Stokes optical path (the first optical path) 21 and the pump optical path (the second optical path) 22 to achieve phase shift in excess of 2 pi (360 degrees). In this example, the delay modulating unit 61 modulates a light path (a length of light path) of the pump light path (the second light path) 22 to achieve phase shift in excess of 2 pi. Since the pump light pulses 12 have a narrower wavelength range R2, the optical path 22 that generates the pump pulses 12 is suitable for modulating the optical path length over an appropriate range.

The delay modulating unit 61 includes a retroreflector 62 and a piezo element 63 for moving the retroreflector 61. The piezo element 63 may function as a vibrator for vibrating the retroreflector 62 and/or as a precision positioning device of the retroreflector 62. The piezo element 63 can move the retroreflector 62 with any type of waveform pattern such as sine, cosine, triangular, and constant voltage. The amplitude of the vibration of the retroreflector 62 can be adjusted using an applied voltage to the piezo element 63 from 0 to 150 V, for example. Frequency of the vibration of the retroreflector 62 can be controlled by the piezo element 63 from approx. 1 kHz or less to several 100 kHz.

The system 10 comprises a modulating control unit 65 that is configured to control or drive the piezo element 63 of the phase modulating unit 60. The modulating control unit 65 includes a self-control unit (a first modulating control unit) 66 and a remote-control unit (a second modulating control unit) 67. The self-control unit 66 cyclically or repeatedly shifts the phase differences between the Stokes pulses (the first light pulses) 11 and the pump pulses (the second light pulses) 12 using the phase modulating unit 60. The self-control unit 66 includes a unit, such as circuits, microcontroller and others for controlling the vibration speed and the amplitude of the retroreflector 61 using the piezo element 63 based on a program preinstalled on the self-control unit 66. The Stokes pulses 11 and the pump light pulses 12 are on the order of femtoseconds (fS) to picoseconds (pS), and the self-control unit 66 may shift the phase differences between the Stokes light pulses 11 and the pump light pulses 12 in a cycle of 1 to 100 kHz or a cycle of 1 to 10 kHz.

The self-control unit 66 may be understood as having the ability, the unit or the function to shift the phase differences between the first light pulses and the second light pulses on pulse-by-pulse basis, microscopically by vibrating the retroreflector 62 with the certain speed and amplitude. The self-control unit 66 may shift or modulate the phase difference about plus and minus pi (180 degrees). The self-control unit 66 may shift or modulate the phase difference in excess of 2 pi range. By modulating the phase difference in excess of the sample acquisition rate, such as milliseconds (mS), we are able to achieve a stable CARS output. This response is stable to both mechanical vibration and temperature variations without and feedback mechanisms.

FIG. 2 shows typical CARS spectra showing glucose components obtained by the simulations. The simulations support the effects of the Stokes-Stokes (S-S) excitation and the phase relationship between the pump and Stokes signal which can be affected by temporal delays equivalent to a fraction of a wavelength as shown in FIG. 2 where the signal varies between min and max amplitudes (the curve 44 and the curve 42) over a phase offset range of pi. The coherent superposition of recorded spectra produces pure Pump-Stokes (Pump-Stokes-Probe) spectra as expected shown as the curve 41. Since the above demonstration heightened sensitivity to environmental stress that could cause rapid fluctuation in signal output, we developed a procedure to reduce sensitivity by modulating the phase in excess of a 2 pi range. If the modulation is greatly in excess of the sample acquisition rate, then we are able to achieve a stable CARS output represented by the curve 43 shown in FIG. 2.

In FIG. 2, the curve 41 depicts a recovered maximum signal that is corresponding to the signal constructively added the signals of coherent Pump-Stokes (Pump-Stokes-Probe) spectra, the curve 42 depicts the simulated maximum spectrum, the curve 43 depicts a recovered Pump-Stokes spectrum that is corresponding to the spectra obtained by the signals of the system 1 as the phase modulating unit 60 is used under the control of the self-control unit 66, the curve 44 depicts the simulated minimum signal, the curve 45 depicts a recovered minimum signal that is corresponding to the signal destructively added the signals of coherent Pump-Stokes spectra, and the curve 46 depicts the Stokes-Stokes (Stokes-Stokes-probe) excitation. By using the phase modulating unit 60 in the vibrating mode (the self-control mode), it is possible to implement the phase sweeping in the pump beam pulses 12 that has successfully de-sensitized the signal as the spectra are averaged over the full range of phase differences (phase delays).

The remote-control unit (the second modulating control unit) 67 of the modulating control unit 65 is configured to vary the phase differences between the Stokes light pulses 11 and the pump light pulses 12 so that peak of a known component of spectrum, for example the peak of the spectrum showing glucose components, of the CARS light pulses is maximized. The analyzer 56 of the controller 55 can control the remote-control unit 67 to change the phase differences using the phase modulating unit 60 while monitoring the peak height showing glucose and fix the phase difference under the condition where the peak height is at its highest. On this condition, the detector can get constructively added signals of coherent Pump-Stokes spectra at least around the spectra of glucose components that could be the region of interest (ROI) of the measurement of certain applications. The conditions for maximizing the peak height vary depending on temperature and other factors, and the remote-control unit 67 can follow the fluctuations by periodically searching the phase difference using the phase modulating unit 60. The same process can be applied when changing the ROI. A test sample with known components and concentrations may be used in searching for conditions when maximizing peaks. The remote-control mode is an alternative and slightly more complicated approach that uses a servo loop to adjust the phase differences (temporal delays) of the probe light pulses 12 to maximize the CARS signal. This is effective as long as the loop response can be faster than the rate at which the temperature or mechanical stresses can affect the CARS output response.

FIG. 3 shows another embodiment of the system 1 including an optical system 10*a*. This optical system 10*a* includes a phase modulating unit (a first phase modulating unit) 60 including a delay modulating unit 64 that is configured to modulate a light path (a length of light path) of the Stokes light path (the first light path) 21 to achieve phase shift of the first laser pulses 30*a* in excess of 2 pi prior to generating the broad band Stokes pulses by the PCF 21*a*. Other optical paths and elements of the optical system 10*a* depicted in this figure are common to those of the optical system 10 depicted in FIG. 1.

FIG. 4 shows yet another embodiment of the system 1 including an optical system 10*b*. The optical system 10*b* is a hybrid optical system that uses OCT (Optical Coherence Tomography) and CARS (Coherent Anti-Stokes Raman Scattering) to acquire data indicative of surface and internal conditions and components of a target 5 such as a human body. The controller 55 includes an OCT analyzing module 56*a* for generating OCT images from the interference light pulses 16 detected by the detector 50 and the monitoring module 56*c* that verifies the part of target 5 at which the TD-CARS light pulses 17 are generated, for confirming the reliability of information by the TD-CARS light pulses 17 and analyzing the target 5 in cooperation with the information of the OCT images. The controller 55 further includes a TD-CARS analyzing module 56*b* for analyzing at least a part of compositions of a part of the target 5 using detection results of the TD-CARS light pulses 17.

The hybrid optical system (optical system) 10*b* includes a laser source 30 for generating, in addition to the first laser pulse 30*a* with a first wave length 1040 nm for the Stokes light pulses 11 and the pump light pulses 12, a second laser pulses 30*b* with a second wavelength 780 nm for OCT light pulses 13 and probe light pulses (probe beam, third light pulses) 14. The second laser pulses 30*b* may include one to several tens pS (pico second)-order pulses with tens to hundreds of mW, and the second laser pulses 30*b* with the wavelength of 780 nm may be generated from the source oscillator with a wavelength of 1560 nm.

The optical system 10*b* includes, in addition to the Stokes light path 21 and the pump light path 22, an OCT light path 23 that is configured to supply an OCT light (third light) 13 with a range R4 of wavelengths 620-780 nm shorter than the second wavelength range R2 from the second laser 30*b* that is common to the probe light 14, through a fiber 23*a*. The optical system 10*b* further includes a probe light path (third optical path, probe unit) 24 that is configured to supply the probe light pulses (probe beam pulses, probe pulse, third light pulses) 14 with a third range R3 of wavelength of 780 nm that is shorter than the second wavelength range R2 and larger than or included in the wavelength range R4 from the second laser 30*b* that is common to the OCT light 13. The optical system 10*b* includes a common optical path 28*b* that supplies the OCT light pulses 13 provided by the path 23 via an interferometer 35 and the probe light pulses 14 provided by path 24 to the optical I/O unit 25.

The probe light path 24 includes a time delay unit 24*a* that is configured to control a time difference between emission of the probe light pulses (third light pulses) 14 and emission of the pump light pulses (second light pulses) 12. The time delay unit may have collimators and a motorized delay stage that can control the distance between the collimators. Time delay may be controlled by the laser control unit 58 in the controller 55. By using the time delay unit 24*a*, the probe light path 24 can supply the probe light pulses 14 with a time difference from the emitting the pump light pulses 12 for emitting to the target 5 via the optical I/O unit 25 to get the delayed CARS pulses 17 that are delayed a few 10 to few 100 fS (femto seconds) or more from the pump pulses 12.

The optical I/O unit (optical unit, lens system) 25 coaxially outputs the Stokes light pulses 11, the pump light pulses 12, the probe light pulses 14, and the OCT light pulses 13 to the target 5 and acquires the CARS light (TD-CARS light) pulses 17 from the target via a common light path 28*c*. Also, through the optical unit (lens) 25, the OCT light pulses 13 are emitted or irradiated to the target and reflected light pulses 15 are acquired or received from the target 5.

FIG. 5 shows an example of an interferometer 35. The interferometer 35 includes a reference unit 34 that is configured to split off a reference light pulses 13*r* from the OCT light pulses 13 with a reference mirror 34*m*. The fiber interferometer 35 includes four arms (light paths) to separate and mix the lights. For the OCT light pulses 13, a part of the inputted light from a port 35*a* is separated as the reference light pulses 13*r* to the reference mirror 34*m* via a port 35*c* and the other part is outputted to the sample (object, target) 5 via a port 35*b*. The returned (reflected) OCT light pulses 15 from the target 5 is inputted via the port 35*b*, combined or multiplexed with the reference light pulses 13*r* to generate the interference light pulses 16. The interference light pulses 16 are outputted to a detector 50 via a port 35*d*. The CARS light pulses 17 are also supplied to the detector 50 through the interferometer 35 using the port 35*b* and 35*d*.

In the optical system 10*b*, using the optical paths above, in order from the laser source 30 side, the OCT light pulses 13 are supplied through the shared path with the probe light pulses 14 in time division. Both pulses 13 and 14 are supplied through the shared path with the Stokes light pulses 11 and the pump light pulses 12, then through the optical I/O unit 25 such as the object lens (lens system), these pulses are emitted to and irradiated on the target 5 such as a skin of human. The reflected or generated light pulses (the reflected light pulses 15 and the CARS light pulses 17) from the target 5 is acquired through the object lens of the optical unit 25 and goes back to the paths of the optical system 10*b*.

The optical element such as a dichroic mirror for sharing routes with the OCT light pulses 13 and the probe light pulse 14 may be a separator or selecting unit that is configured to select reflected light pulses 15 of the OCT light having 620-780 nm and CARS light pulses 17. In this system 10*b*, a TD-CARS light pulses 17 with a range R5 of wavelengths of 680-760 nm that is shorter than the wavelength range R3 and is at least partly overlapping the OCT wavelength range R4 is filtered from the acquired light and supplied to the detector 50. The TD-CARS light pulses 17 is generated by the Stokes light pulses 11, the pump light pulses 12, and the probe light pulses 14 at the target 5. Both the TD-CARS light pulses 17 and the interference light pulses 16 are supplied to the detector 50 through the interferometer 35 in this optical system 10*b*, but other optical paths for making the interference light and supplying the interference light pulses 16 and the TD-CARS light pulses 17 to the detector 50 may be provided in the optical system 10*b*.

The detector 50 of the optical system 10*b* includes a range DR of detection wavelengths shared with the TD-CARS light pulses 17 and the interference light pulses 16. Typically, the detector 50 may have the same detection range (measurement range) DR as the larger one of the wavelength range R4 of the OCT light 13 and the wavelength range R5 of the TD-CARS light 17. For example, in this optical system 10*b*, the TD-CARS light pulses 17 have the range R5 of wavelengths of 680-760 nm, the OCT light pulses 13 have the range R4 of wavelengths 620-780 nm, and the detection range DR is set to cover the range of wavelengths 620-780 nm or over. By applying the single and common detector 50 that shares the range DR of detection wavelengths between CARS and OCT detection, the system configuration becomes simplified, and CARS detector's spectral resolution and OCT imaging depth are increasing.

The optical system 10*b* may comprise an optical element for switching generating or supplying the CARS light pulses 17 and the interfering light pulses 16 in a time-division manner. The optical system 10 may comprise a generating optical path that is configured to generate the OCT light pulses 13 and the probe light pulses 14 from the second laser light pulses 30*b* with switching element. The switching element may be a MEMS mirror that changes the direction of the source laser 30*b* to the probe light path 24 and the OCT light path 23 under control of a laser control unit 58 in the controller 55.

FIG. 6 shows one of the wavelength plans of this optical system 10*b*. In the plan shown in FIG. 6, Stokes light pulses 11 have the first range R1 of wavelengths 1085-1230 nm (400 $cm^{-1}$~1500 $cm^{-1}$), Pump light pulses 12 have the second range R2 of wavelengths 1040 nm, Probe light pulses 14 have the third range R3 of the wavelengths 780 nm, OCT light pulses 13 have the range R4 of wavelengths 620-780 nm, and TD-CARS light pulses 17 have the range R5 of the wavelengths 680-760 nm. The all of ranges R1, R2, R3, R4 and R5 are included in the range of wavelengths 600 nm to 1300 nm. The second range R2 is shorter than the first range R1, the third range R3 is shorter than the second range R2, the third range R3 is shorter than the second range R2 and larger than or included in the third range R4, and the range R5 of TD-CARS 17 is shorter than the third range R3 and at least partly overlapping the OCT range R4.

The optical system 10*b* further includes, in addition to the first phase modulating unit 60, a second phase modulating unit 70 that is configured to vary phase differences of the probe pulses (the third light pulses) 14 in relation to the Stokes light pulses (the first light pulses) 11 and the pump light pulses (the second light pulses) 12. The phase modulating unit 70 includes a delay modulating unit 71 that is configured to modulate a light path (a length of light path) of the probe optical path (the third optical path) 24 to achieve phase shift in excess of 2 pi. The delay modulating unit 71 includes a retroreflector 72 and a piezo element 73 for moving the retroreflector 71. The piezo element 73 may function as a vibrator for vibrating the retroreflector 72 and/or as a precision positioning device of the retroreflector 72 as is explain for the first phase modulating unit 60. The amplitude of the vibration of the retroreflector 72 can be adjusted using an applied voltage to the piezo element 73 from 0 to 150 V, for example. Frequency of the vibration of the retroreflector 72 can be controlled by the piezo element 73 from approx. 1 kHz or less to several 100 kHz.

The system 10*b* comprises a modulating control unit 75 that is configured to control or drive the piezo element 73 of the phase modulating unit 70. The modulating control unit 75 includes a self-control unit (a third modulating control unit) 76 and a remote-control unit (a fourth modulating control unit) 77. The self-control unit 76 is configured to cyclically or repeatedly shift the phase differences of the probe light pulses 14 in relation to the Stokes light pulses 11 and the pump light pulses 12 in the same way as described above for the self-control unit 66. The remote-control unit 77 configured to vary the phase differences of the probe light pulses 14 in relation to the Stokes light pulses 11 and the pump light pulses 12 so that peak of a known component of spectrum of the TD-CARS light pulses 17 is maximized. The detail functions of the remote-control unit 77 are common to the remote-control unit 67 described above.

FIG. 7 is a flow diagram (flowchart) that illustrates a process performed by the system 1. The process is carried out by the program (program produce, software, application) 59 stored in the memory of the controller 55. At step 81, the laser controller 58 controls the laser source 30 and the optical system 10*b* to emit the Stokes light pulses (first light pulses) 11 with the first range R1 of wavelengths and the pumps light pulses (second light pulses) 12 with a second range R2 of wavelengths shorter than the first wavelength range R1 through the optical I/O unit (optical unit) 25. In step 81, at least one of the Stokes light pulses 11 and the pump light pulses are emitted with phase modulating by the phase modulating unit 60 to vary the phase differences between the Stokes light pulses 11 and the pump light pulses 12 as these pulses are emitted thought the optical unit 25.

The Stokes light pulses 11 or the pump light pulses 12 are modulated in one of two modes, self-control mode 81*a* and remote-control mode 81*b*. In the self-control mode 81*a*, the phase modulating unit 60 cyclically or repeatedly shifts the phase differences between the Stokes light pulses 11 and the pump light pulses 12 by the self-control unit 66. In the remote-control mode 81*b*, the phase modulating unit 60 varies the phase differences between the Stokes light pulses 11 and the pump light pulses 12 so that peak of a known component of spectrum of the CARS light pulses 17 is maximized by the remote-control unit 67.

At step 82, the laser controller 58 controls the laser source 30 and the optical system 10*b* to emit the probe light pulses (third light pulses) 14 with the third range R3 of wavelength with a time difference from the emitting the pump light pulses 12. At the step 82, the probe light pulses 14 may be emitted to the target 5 varying the time difference from the emitting the pump light pulses 12 using the time delay unit 24*a*. In step 82, the probe light pulses 14 are emitted with phase modulating by the phase modulator 70 to vary the phase differences of the probe light pulses 14 in relation to the Stokes light pulses 11 and the pump light pulses 12.

The probe light pulses 14 are modulated in one of two modes, self-control mode 82*a* and remote-control mode 82*b*. In the self-control mode 82*a*, the phase modulating unit 70 cyclically or repeatedly shifts the phase differences of the probe light pulses 14 in relation to the Stokes light pulses 11 and the pump light pulses 12 using the self-control unit 76. In the remote-control mode 82*b*, the phase modulating unit 70 varies the phase differences of the probe light pulses 14 in relation to the Stokes light pulses and the pump light pulses 12 so that peak of a known component of spectrum of the TD-CARS light pulses 17 is maximized using the remote-control unit 77.

At step 83, the detector 50 detects a TD-CARS light pulses 17 generated by the Stokes light pulses 11, the pump light pulses 12, and the probe light pulses 14 at the target 5. At step 84, a TD-CARS analyzing module 56*b* of the analyzer 56 may analyze at least a part of compositions of a part of the target 5 using detection results of the TD-CARS light pulses 17.

At step 85, before or after the step 84 or in parallel, the laser controller 58 controls the laser source 30 and the optical system 10*b* to emit the OCT light pulses 13 with the range R4 of wavelengths in time division from the probe light pulses 14 through the optical unit 25 to the target 5. At step 86, the detector 50 detects the interference light pulses 16 generated by the reference light pulses 13*r* and the reflected light pulses 15 from the target 5 in time division from the TD-CARS light pulses 17.

At step 87, the OCT analyzing module 56*a* of the analyzer 56 may generate OCT images from the interference light pulses 16 detected by the detector 50 and the monitoring module 56*c* of the analyzer 56 may verify the part of target 5 at which the TD-CARS light pulses 17 are generated, for confirming the reliability of information by the TD-CARS light pulses 17 and analyzing the target 5 in cooperation with the information of the OCT images and the information of the TD-CARS light 17.

The system 1 described above is easy to customize, low in cost, and capable of supplying a system suitable for measurement, research, monitoring and/or self-care in various filed. The system 1 may be a minimum invasive device, a non-invasive device, flow sampler device, or a wearable device for measuring glucose, hemoglobin A1c, creatinine, albumin and the like.

One of the aspect of disclosed above is a system comprising: (a) a first unit that is configured to emit a first light, such as a stocks light, with a first range of wavelengths; (b) a second unit that is configured to emit a second light, such as a pump light, with a second range of wavelengths shorter than the first range; (c) a phase modulating unit that is configured to cyclically shift a phase of at least one of the first light and the second light; and (d) an optical unit that is configured to output the first light and the second light to a target and acquire a light from the target to detect a CARS light from the target by a detector. If the modulation is greatly in excess of the sample acquisition rate, then we are able to achieve a stable CARS to both mechanical vibration and temperature variations without and feedback mechanisms. One of embodiment may have a piezo element that modulates a mirror to achieve the phase shift in excess of 2 pi.

A simple embodiment is shown where a piezo element modulates a mirror to achieve the phase shift in excess of 2 pi. Implementation of the phase sweep in the pump beam shows successfully de-sensitized the signal as the spectra are averaged over the full range of phase delays. Any embodiment that allows probe temporal modulation can achieve this effect.

An alternative and slightly more complicated approach is to use a servo loop to adjust the temporal delay of the probe signal to maximize the CARS signal. This is effective as long as the loop response can be faster than the rate at which the temperature or mechanical stresses can affect the CARS output response.

Another aspect of this specification is a method comprising detecting a CARS light by a detector. The detecting includes emitting a first light with a first range of wavelengths and a second light with a second range of wavelengths shorter than the first range via a phase modulating unit that is configured to cyclically shift a phase of at least one of the first light and the second light, to a target to generate the CARS light.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A system comprising:
- a first optical path configured to supply first light pulses with a first range of wavelengths;
- a second optical path configured to supply second light pulses with a second range of wavelengths shorter than the first range of wavelengths;
- an optical I/O system configured to irradiate the first light pulses and the second light pulses to a target and acquire a light from the target to detect CARS light pluses from the target by a detector;
- a first phase modulator configured to vary phase differences between the first light pulses and the second light pulses as the first light pulses and the second light pulses are irradiated via the optical I/O system; and
- a first modulating controller configured to cyclically shift the phase differences between the first light pulses and the second light pulses using the first phase modulator,
- wherein the first light pulses and the second light pulses are on the order of femtoseconds to picoseconds, and the first modulating controller shifts the phase differences between the first light pulses and the second light pulses in a cycle of 1 to 100 kHz.

2. The system according to claim 1, wherein the first phase modulator is further configured to shift the phase differences between the first light pulses and the second light pulses on pulse-by-pulse basis.

3. The system according to claim 1, further comprising a second modulating controller configured to vary the phase differences between the first light pulses and the second light pulses so that peak of a known component of spectrum of the CARS light pulses is maximized.

4. A system comprising:
- a first optical path configured to supply first light pulses with a first range of wavelengths;
- a second optical path configured to supply second light pulses with a second range of wavelengths shorter than the first range of wavelengths;
- an optical I/O system configured to irradiate the first light pulses and the second light pulses to a target and acquire a light from the target to detect CARS light pluses from the target by a detector; and
- a first phase modulator configured to vary phase differences between the first light pulses and the second light pulses as the first light pulses and the second light pulses are irradiated via the optical I/O system,
- wherein the first phase modulator includes a delay modulator that is configured to modulate a light path of at least one of the first optical path and the second optical path to achieve phase shift in excess of 2 pi.

5. The system according to claim 4, wherein the delay modulator includes a retroreflector and a piezo element for moving the retroreflector.

6. The system according to claim 4, wherein the delay modulator modulates a light path of the second optical path.

7. The A system comprising:
- a first optical path configured to supply first light pulses with a first range of wavelengths;
- a second optical path configured to supply second light pulses with a second range of wavelengths shorter than the first range of wavelengths;
- an optical I/O system configured to irradiate the first light pulses and the second light pulses to a target and acquire a light from the target to detect CARS light pluses from the target by a detector;
- a first phase modulator configured to vary phase differences between the first light pulses and the second light pulses as the first light pulses and the second light pulses are irradiated via the optical I/O system;
- a third optical path configured to supply third light pluses with a third range of wavelengths shorter than the second range of wavelengths to irradiate to the target via the optical I/O system; and
- a second phase modulator configured to vary phase differences of the third light pulses in relation to the first light pulses and the second light pulses.

8. The system according to claim 7, further comprising a time delay module configured to control a time difference between the third light pulses and the second light pulses.

9. The system according to claim 7, further comprising a third modulating controller configured to cyclically shift the phase differences of the third light pulses in relation to the first light pulses and the second light pulses.

10. The system according to claim 7, further comprising a fourth modulating controller configured to vary the phase differences of the third light pulses in relation to the first light pulses and the second light pulses so that peak of a known component of spectrum of the CARS light pulses is maximized.

11. A method comprising:
- irradiating first light pulses with a first range of wavelengths and second light pulses with a second range of wavelengths shorter than the first range through an optical system that is configured to output the first light pulses and the second light pulses to a target and acquire CARS light pulses from the target;
- detecting CARS light pulses acquired through the optical system from the target by a detector;
- varying phase differences between the first light pulses and the second light pulses as the first light pulses and the second light pulses are irradiated through the optical system;
- irradiating third light pluses with a third range of wavelengths shorter than the second range of wavelengths through the optical system; and
- varying phase differences of the third light pulses in relation to the first light pulses and the second light pulses.

12. The method according to claim 11, wherein the varying phase differences between the first light pulses and the second light pulses includes cyclically shifting the phase differences between the first light pulses and the second light pulses.

13. The method according to claim 11, wherein the varying phase differences between the first light pulses and the second light pulses includes varying the phase differences between the first light pulses and the second light pulses so that peak of a known component of spectrum of the CARS light pulses is maximized.

14. The method according to claim 9, wherein the varying phase differences of the third light pulses in relation to the first light pulses and the second light pulses includes cyclically shifting the phase differences of the third light pulses in relation to the first light pulses and the second light pulses between the first light pulses and the second light pulses.

15. The method according to claim 9, wherein the varying phase differences of the third light pulses in relation to the first light pulses and the second light pulses includes varying the phase differences of the third light pulses in relation to the first light pulses and the second light pulses so that peak of a known component of spectrum of the CARS light pulses is maximized.

16. A nontransitory computer readable medium encoded with a computer program for a computer to operate a device, wherein the device comprises:

a first optical path configured to supply first light pulses with a first range of wavelengths; a second optical path configured to supply second light pulses with a second range of wavelengths shorter than the first range of wavelengths;

an optical I/O system configured to irradiate the first light pulses and the second light pulses to a target and acquire a light from the target to detect CARS light pluses from the target by a detector; and a first phase modulator configured to vary phase differences between the first light pulses and the second light pulses as the first light pulses and the second light pulses are irradiated via the optical I/O system, the computer program includes executable codes for performing steps of:

varying the phase differences between the first light pulses and the second light pulses so that peak of a known component of spectrum of the CARS light pulses is maximized.

17. The nontransitory computer readable medium according to claim 16, wherein the device further comprises:

a third optical path configured to supply third light pluses with a third range of wavelengths shorter than the second range of wavelengths to irradiate to the target via the optical I/O system; and a second phase modulator configured to vary phase differences of the third light pulses in relation to the first light pulses and the second light pulses, and the computer program further includes executable codes for performing steps of:

varying the phase differences of the third light pulses in relation to the first light pulses and the second light pulses so that peak of a known component of spectrum of the CARS light pulses is maximized.

18. A system comprising:

a first optical path configured to supply first light pulses with a first range of wavelengths;

a second optical path configured to supply second light pulses with a second range of wavelengths shorter than the first range of wavelengths;

an optical I/O system configured to irradiate the first light pulses and the second light pulses to a target and acquire a light from the target to detect CARS light pluses from the target by a detector;

a first phase modulator configured to vary phase differences between the first light pulses and the second light pulses as the first light pulses and the second light pulses are irradiated via the optical I/O system; and a modulating controller configured to perform a computer program that includes executable codes for performing steps of:

varying the phase differences between the first light pulses and the second light pulses so that peak of a known component of spectrum of the CARS light pulses is maximized.

19. The system according to claim 18, further comprising:

a third optical path configured to supply third light pluses with a third range of wavelengths shorter than the second range of wavelengths to irradiate to the target via the optical I/O system; and a second phase modulator configured to vary phase differences of the third light pulses in relation to the first light pulses and the second light pulses, and wherein the modulating controller is further configured to perform the computer program that further includes executable codes for performing steps of:

varying the phase differences of the third light pulses in relation to the first light pulses and the second light pulses so that peak of a known component of spectrum of the CARS light pulses is maximized.

* * * * *